T. DUGAN.
HARVESTER.
APPLICATION FILED DEC. 14, 1918.
1,350,012.
Patented Aug. 17, 1920.
4 SHEETS—SHEET 1.
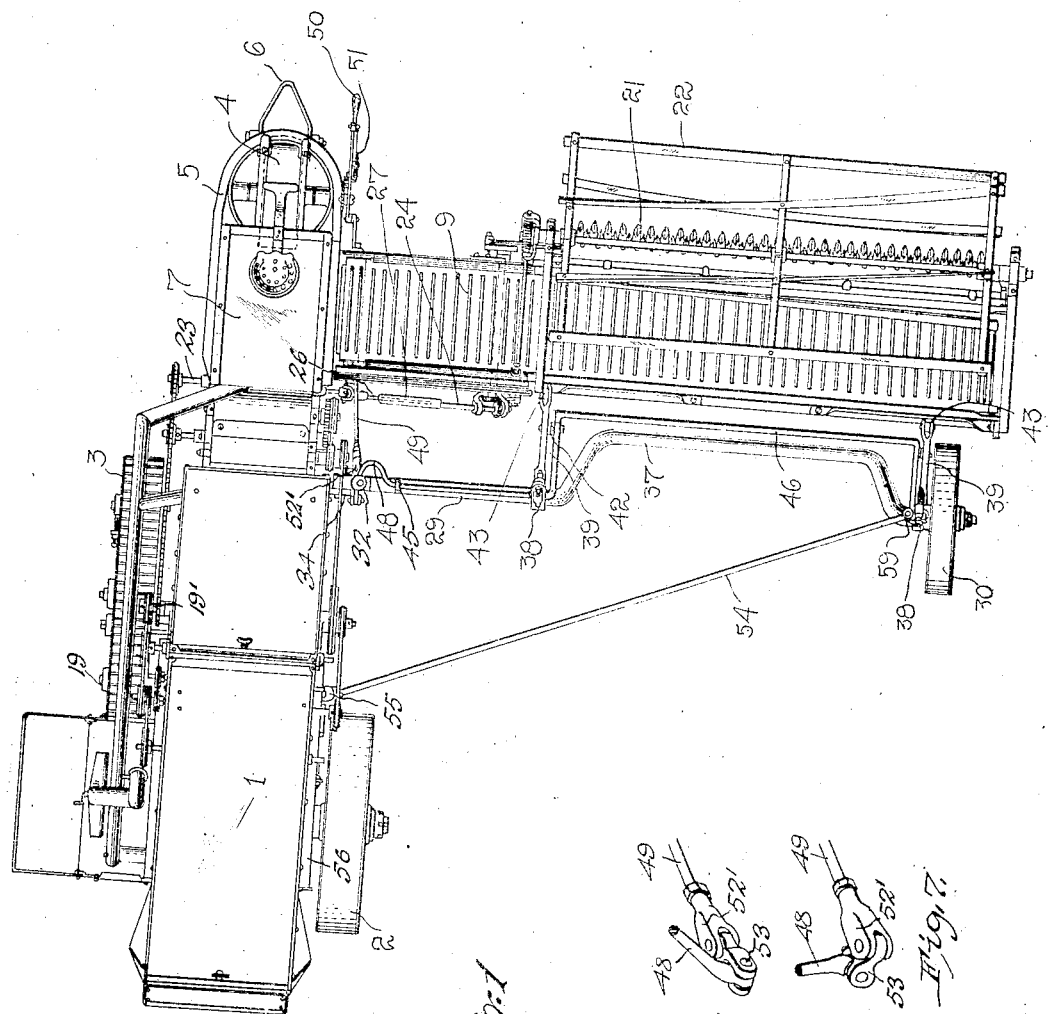
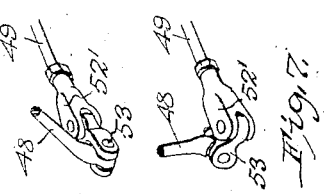
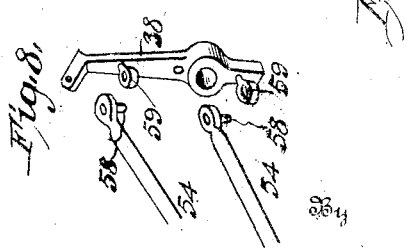
Inventor
Thomas Dugan
Lacey & Lacey, Attorneys

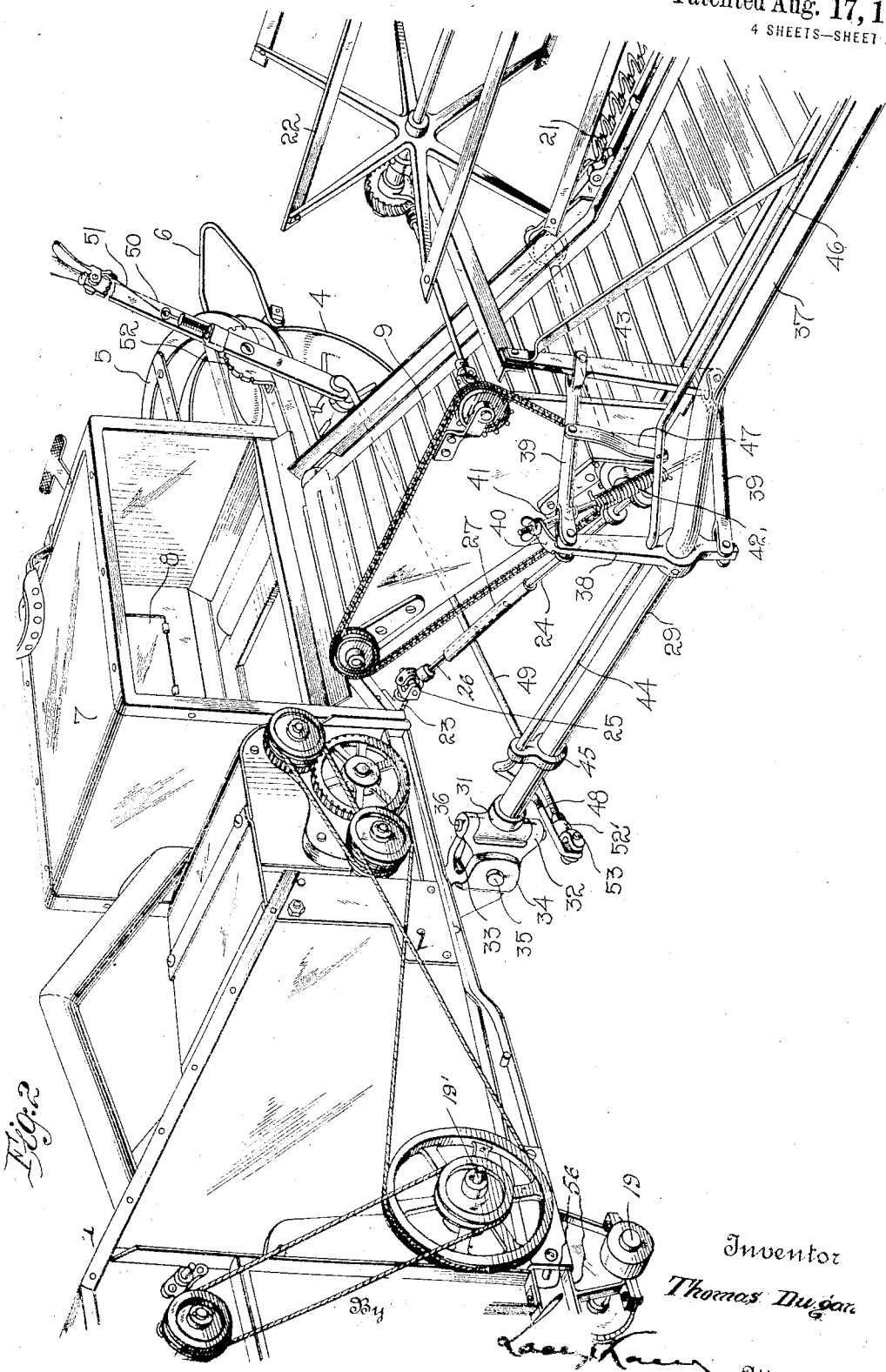

T. DUGAN.
HARVESTER.
APPLICATION FILED DEC. 14, 1918.

1,350,012.

Patented Aug. 17, 1920.
4 SHEETS—SHEET 3.

Fig. 3

Inventor
Thomas Dugan.

By

T. DUGAN.
HARVESTER.
APPLICATION FILED DEC. 14, 1918.
1,350,012.
Patented Aug. 17, 1920.
4 SHEETS—SHEET 4.
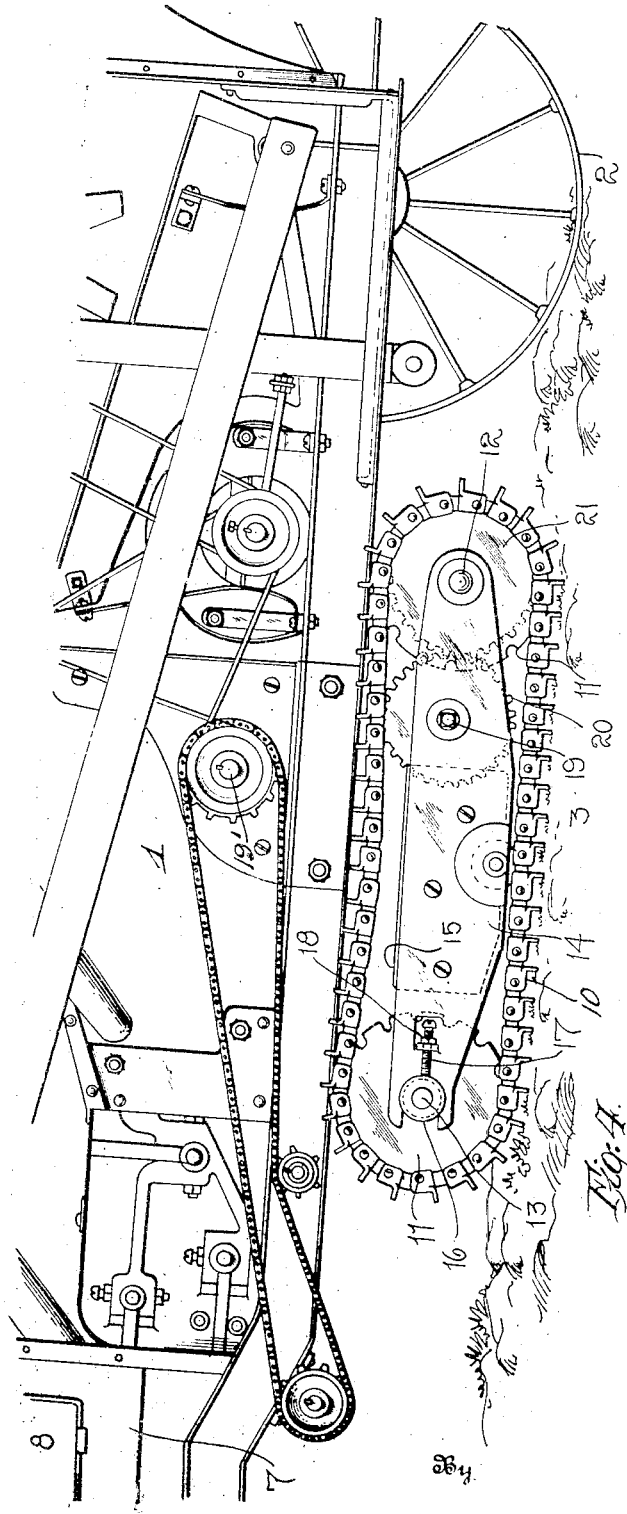
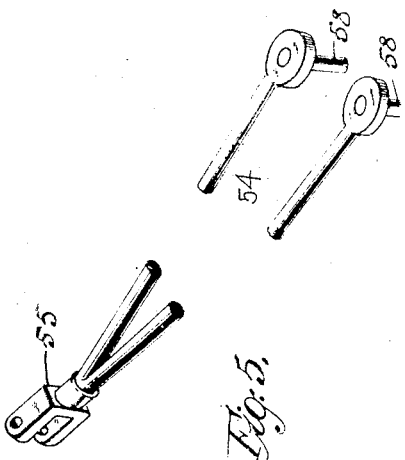
Inventor
Thomas Dugan.
By
Lacey & Lacey, Attorneys

UNITED STATES PATENT OFFICE.

THOMAS DUGAN, OF WICHITA, KANSAS, ASSIGNOR TO J. I. CASE THRESHING MACHINE COMPANY, OF RACINE, WISCONSIN, A CORPORATION.

HARVESTER.

1,350,012.

Specification of Letters Patent. Patented Aug. 17, 1920.

Application filed December 14, 1918. Serial No. 266,778.

*To all whom it may concern:*

Be it known that I, THOMAS DUGAN, a citizen of the United States, residing at Wichita, in the county of Sedgwick and State of Kansas, have invented certain new and useful Improvements in Harvesters, of which the following is a specification.

The primary object of this invention is to provide means whereby the cutting apparatus and the mechanism associated therewith on a combined harvester and threshing machine may all be swung bodily close to the side of the threshing machine when it is desired to transport the machine over roads or bridges. Secondary objects of the invention are to provide a construction which will facilitate access to the concave and cylinder of the threshing machine when repairs to the same are needed and also to provide means whereby to avoid derangement of the operating parts when the harvester is swung back against the thresher. Other incidental objects of the invention will appear in the course of the following description.

The invention is illustrated in the accompanying drawings and consists in certain novel features which will be particularly pointed out in the claims following the description, and in the said drawings—

Figure 1 is a plan view of a combined harvester and threshing machine having my improvements applied thereto, the harvesting mechanism being shown extended in its operative position;

Fig. 2 is an enlarged perspective view of the inner end of the harvester and the forward end of the threshing machine showing the means whereby the harvesting mechanism is supported and also showing the construction by which access to the concave and threshing cylinder is facilitated;

Fig. 3 is an enlarged plan view of a portion of the apparatus showing the harvester swung back so as to permit transportation of the machine;

Fig. 4 is a side elevation showing the traction device whereby the operating mechanism is actuated;

Fig. 5 is a detail of a removable brace;

Figs. 6 and 7 are detailed views of a coupling employed in the mechanism for raising and lowering the harvester;

Fig. 8 is a detail perspective view of a portion of the means for holding the harvester in its forward position.

The threshing machine, indicated by the reference numeral 1, may be of any desired construction and is supported at one side by a ground wheel 2 and at its opposite side by a traction device 3. At its front end the threshing machine is supported by a steering wheel 4 mounted in the forward end 5 of the frame for turning movement in a horizontal plane and to the turntable which carries the said steering wheel, in the illustrated embodiment of the invention, a draft device 6 is attached so that draft animals may be hitched to the machine as will be readily understood. It is to be understood, however, that the manner of effecting travel of the machine is unimportant and any moving agency arranged in any preferred manner may be employed. Upon the forward end of the frame of the threshing machine and immediately in advance of the threshing cylinder and concave, I mount a housing 7 which is of ample dimensions and has one side closed by a removable panel 8. The conveyer 9 of the harvesting mechanism is so disposed as to discharge through the open side of this housing 7 and the grain will, therefore, be delivered directly to the cylinder and concave and, should the cylinder or concave need repairs, as frequently happens, the open side of the housing permits ready access to said parts. The panel 8 may be of any desired form and secured in place by any convenient means and will prevent the grain being thrown through the casing and will also prevent persons adjacent the machine falling into the casing immediately in advance of the threshing mechanism. It will be understood, of course, that the panel is utilized to close the side of the hood opposite that side into which the harvester discharges and either side may be closed accordingly as the harvester is arranged at one or the other side of the threshing machine, it being possible to apply the invention to threshing machines of various types now in use without substantial changes in any of the parts.

The traction device 3 comprises an endless chain at the outer edge of each link of which is an angle bar 10 having one flange disposed to project outwardly from the edge of the link so as to engage the ground on the under run of the chain, as shown clearly in Fig. 4. The chain is supported on sprockets 11, the rear sprocket being preferably secured upon a shaft 12 which is journaled in any preferred manner upon the bottom of the threshing machine frame, while the forward sprocket is carried by a shaft 13 which is supported in the forward ends of plates 14 having their rear ends fitted upon the shaft 12 and their intermediate portions connected by a bracing bridge 15. The shaft 13 is suitably mounted in notches or slots 16 in the forward ends of the plates 14 and an adjusting screw 17 engages the adjacent bearing of the said shaft and has its rear end mounted in a bracket 18 secured upon the side plate 14 so that by manipulating the said screw the shaft 13 may be adjusted longitudinally of the side plates and the proper tension thereby maintained upon the traction chain. In the rear portions of the side plates between the bridge 15 and the shaft 12 is mounted the driving shaft 19 which carries a spur gear 20 meshing with a similar gear 21 secured upon the shaft 12 so that the rotation of the said shaft 12 will be imparted directly to the driving shaft 19 which extends under and across the machine and from which all of the operating mechanism is driven as, for instance, by operatively connecting the driving shaft with a countershaft 19' which actuates gearing for transmitting motion to all of the working parts. The particular form or arrangement of gearing employed, however, forms no part of my present invention and a detailed description thereof herein is unnecessary.

The harvesting mechanism is shown in the present drawings as arranged at the right side of the threshing machine but it is to be understood that this showing is illustrative only and not restrictive as the invention is to be applied in such manner as may be necessitated by the type of threshing machine used. The harvesting mechanism comprises the conveyer 9 mounted to run in a frame normally disposed transversely to the threshing machine, a cutter 21 disposed at the front side of said conveyer, and a reel 22 supported above the cutter, these parts being of any well-known form and being driven from the threshing machine. The operating parts of the harvester are all carried by the frame of the same and may be swung rearwardly when the harvester is not in use and the apparatus is to be transported. The power may be transmitted from the thresher to the harvester in any convenient or preferred manner and, in the present instance, is derived from a shaft 23 extending across the bottom of the frame of the thresher. To accommodate the relative movement of the harvester, the shaft 24, by which the power is transmitted to the actuating mechanism of the harvester, is shown as telescopic and connected with one end of the shaft 23 by a universal joint 25. One member 26 of the telescopic shaft 24 is angular in cross section and slidably engages a tubular enlargement 27 at the opposed end of the coöperating member of the shaft, the bore of said tubular enlargement being of the same angular cross section as the member 26 whereby the two parts of the shaft must rotate together but are capable of relative movement longitudinally. This construction will permit the driving mechanism to accommodate itself to the vertical adjustment of the harvester and to the vertical oscillation of the same while in use caused by travel over an irregular or rough surface and will also provide for the needed extension of the shaft as the harvester is swung rearwardly. I do not, however, limit myself to this particular arrangement but may employ any other flexible transmitting mechanism. The angular shaft member 26 is preferably made long enough to remain normally in engagement with the tubular enlargement 27 in all positions of the harvester, but when the harvester is swung rearwardly, as shown in Fig. 3, the tubular enlargement may be withdrawn from the said member 26 which will thereupon assume a pendent position relative to the universal joint 25 while the enlargement 27 and the main portion of the shaft 24 will be engaged upon a support 28 carried by the frame of the harvester so that it will not drag upon the ground and be exposed to injury.

The harvester is supported upon an axle 29 upon the outer end of which is a grain wheel 30. The inner end of the axle is provided with a T-coupling 31 fitting between the perforated ears 32 on a coupling member which is also provided with a single ear 33 adapted to fit within the yoke 34 which is secured to the frame of the threshing machine. A pivot pin 35 is inserted horizontally through the branches of the yoke 34 and the ear 33 while a vertical pivot pin 36 is inserted through the ears 32 and the coupling 31. In this manner the inner end of the axle is connected to the threshing machine so as to be capable of movement in both a horizontal and a vertical plane and, consequently, the harvester will readily adapt itself to inequalities in the ground and may be swung rearwardly close to the side of the threshing machine when so desired, as shown in Fig. 3. The intermediate portion of the axle 29 is bowed or cranked as shown at 37, so that it will fit close to the rear side of the harvester frame and will, therefore, not interfere with the travel of the machine or provide an obstruction to the dropping of any grain which may pass over the rear side of the frame. The bowed or cranked form of the axle also permits it to clear the ground wheel 2 when the harvester is folded close to the side of the threshing machine so as to bring the apparatus into as narrow a compass as possible, this compact arrangement being clearly shown in Fig. 3. Upon the axle, adjacent the ends of the bowed portion thereof, I secure standards 38 which project above and below the axle, as shown most clearly in Fig. 2, and to the extremities of these standards I pivotally attach the rear ends of links 39, the upper ends of the standards being provided each with a forwardly projecting arm 40. In the forward end of said arm 40, I mount an adjusting screw 41 which has its lower end secured to or engaged in a coiled spring 42, the lower end of which is connected with the lower link 39. The forward ends of the links 39 are pivoted to standards or posts 43 which form a part of the harvester frame and it will be readily understood that by swinging the links in a vertical plane about their pivotal connections with the standards 38 the harvester frame may be raised or lowered so that the cutter 21 may be adjusted to run at the desired height. The spring 42 obviously tends to hold the harvester frame in a raised position relative to the axle and reduces the labor of adjusting the cutter. To adjust the harvester vertically, I employ a rock shaft 44 which is journaled in the standards 38 and in a bearing 45 secured upon the axle, as shown, the intermediate portion of this rock shaft being bowed or cranked, as shown at 46, to conform to and lie normally in advance of the bowed portion of the axle. To the ends of the cranked or bowed portion 46 of this rock shaft I pivot the lower ends of links 47, the upper ends of said links being pivoted to the upper links 39. The inner end of the rock shaft 40 is constructed with an irregularly curved crank arm 48 which extends forwardly and then downwardly around and under the inner end of the axle and has its extremity pivoted to the rear end of a connecting rod or pitman 49 which has its front end pivoted to the lower end of a hand lever 50 which is fulcrumed upon the forward end of the frame of the threshing machine and is equipped with a latch 51 to engage a holding segment 52 in the usual manner. The pivotal connection between the crank 48 and the connecting rod 49 comprises a coupling 52' secured upon the rear end of the connecting rod and a yoke 53 pivoted at one end to said coupling and at its opposite end to the extremity of the crank 48, the said pivots being disposed at right angles to each other so that the relative angular movement between the connecting rod and the crank will be accommodated when the harvester is being adjusted vertically and also when it is being swung forwardly or rearwardly.

When the parts are in their normal position and the machine is in operation, being drawn over a field, the harvester is held to its forward position by a brace 54 which consists of two rods of proper length and diameter secured together at their inner ends and carrying a yoke or fork 55 which is adapted to fit between the flanges 56 on the side member of the threshing machine frame and be held thereto by a pin inserted through an opening 57 in said flanges and the end of the fork. The outer ends of these rods carry depending studs or pins 58 which are engaged in eyes 59 on the outer standard 38 above and below the axle so that any tendency of the harvester to swing rearwardly about its pivot 36 will be effectually resisted. When the harvester is to be swung to the position shown in Fig. 3 so that the machine may be transported from place to place, the pins or studs are released from the eyes 59 and the holding pin withdrawn from the inner end of the brace. The harvester may then be swung rearwardly, it being understood that the tubular enlargement 27 will slide readily from the driving shaft member 26 and that the coupling between the connecting rod 49 and the crank 48 is disposed in the plane of the vertical pivot 36. The harvester will be supported in this turning movement by the grain wheel 30 at its outer end and, after it has been swung rearwardly, the rear end of the harvester may be supported by a chain or similar device 60 attached to the outer or rear crank of the axle and to the threshing machine so that the grain wheel 30 will be raised from the ground and will not drag so as to impede the progress of the machine.

From the foregoing description, taken in connection with the accompanying drawings, it will be seen that I have provided means of simple, compact and inexpensive form whereby the harvester may be swung rearwardly so as to assume a position close to the side of the threshing machine and thereby permit the apparatus to be transported without necessitating the disassembling of the parts. I thereby effect a very pronounced saving of time and also avoid the loss of working parts which are apt to be misplaced if the machine be disassembled. In swinging the harvester to its rear folded position, it is not necessary to disconnect any of the parts except the brace 54 which is an exceedingly simple operation so that all the work may be done by one man without any prolonged laborious effort. The latch 51, of course, must be released to permit the lever 50 to swing rearwardly at its lower end and follow the movement of the coupling 52'. The telescopic construction of the driving shaft permits the members of the same to automatically separate as the harvester swings rearwardly and with some types of machines it will be possible to so locate the driving shaft that its pivotal connection with the main shaft on the threshing machine will be in the vertical plane of the pivotal support for the inner end of the axle, in which event the driving shaft will swing so nearly concentric with the axle and the rock shaft 44 that separation of the parts of the driving shaft will not occur and will not be necessary. The vertical adjustment of the harvester does not affect and is not affected by the adaptability of the same to be folded close to the side of the threshing machine and each of these functions may be performed readily and easily. It is also to be noted that the entire weight of the harvester is borne by the axle and the grain wheel and that while the grain mowed by the cutter 21 is caught by the conveyer 9 and delivered by said conveyer into the threshing machine the conveyer is not attached to the threshing machine and, consequently, it does not interfere in any way with the swinging of the harvester to its rear folded position.

Having thus described my invention, what I claim as new is:

1. In a combined harvester and threshing machine, the combination with a threshing machine, and a harvester disposed transversely with respect to the threshing machine, of means for supporting the harvester from the threshing machine and permitting relative turning movement thereof in a horizontal plane, and means for operating the harvester from the threshing machine, said operating means being extensible to permit the said relative turning movement of the harvester.

2. The combination with a threshing machine, and a harvester disposed transversely with respect to the threshing machine, of an axle supporting the harvester, a wheel on the outer end of said axle, and a universal coupling connecting the inner end of the axle to the threshing machine whereby the harvester may follow undulations of the ground and may be swung rearwardly to the side of the thresher.

3. In a combined thresher and harvester, the combination with a threshing machine, of a harvester disposed transversely of the thresher, a support for the harvester having a universal connection with the thresher frame at its inner end whereby to permit movement of the harvester vertically and also rearwardly, means for normally retaining the harvester against movement rearwardly about said connection, and means for operating the harvester from the threshing machine, said operating means including an extensible member whereby to permit rearward movement of the harvester.

4. In a combined thresher and harvester, the combination of a threshing machine, a harvester disposed transversely with respect to the threshing machine, an axle supporting the harvester and pivotally connected at its inner end with the frame of the thresher, a standard at the outer end of said axle, eyes on said standard, and a brace provided with studs at its outer end engaging said eyes and having its inner end constructed to be attached to the threshing machine.

5. In a combined harvester and thresher, the combination of a threshing machine, a harvester disposed transversely relative to the thresher, a support for the harvester connected at its inner end with the thresher frame for universal movement, a telescopic driving shaft arranged to actuate the harvester mechanism, means on the thresher for actuating said driving shaft, and a universal coupling between said telescopic driving shaft and the said actuating means.

6. In a combined harvester and thresher, the combination of a thresher, a harvester disposed transversely with respect thereto, a support for the harvester pivotally connected at its inner end with the thresher frame, and means for adjusting the harvester vertically with respect to said support, said means comprising vertically swinging members carried by said support and controlling means including a pivotal connection in the vertical plane of the pivotal connection between the support and the thresher.

7. The combination of a thresher, a harvester, a supporting axle pivoted to the thresher for rearward swinging movement, standards carried by said axle, links pivoted on said standards and to the harvester, means tending to hold said links in a raised position, and means mounted on the axle for swinging said links in a vertical plane.

8. The combination of a thresher, a harvester, a supporting axle pivoted to the thresher for rearward swinging movement, a rock shaft mounted on said axle, means on the thresher for turning said rock shaft and holding it in a set position, a swinging support mounted on the axle and connected to the harvester, connections between the rock shaft and said support whereby to lift the same, and means for cushioning the support.

9. The combination of a thresher, a harvester supported from the thresher transversely thereto and arranged to fold close to the side thereof, and a flexible power-transmitting mechanism interposed between the harvester and the thresher whereby to operate the harvester from the thresher.

10. The combination of a thresher provided with a ground wheel on its side near its rear end, an axle pivotally connected at its inner end to the thresher in advance of said ground wheel, said axle being bowed in its intermediate portion, standards on said axle at the ends of the bowed portion thereof, links pivoted at their rear ends to said standards and at their front ends to the harvester, a rock shaft having bearings on the axle and bowed to conform to the axle, connections between the ends of the bowed portion of said rock shaft and the respectively adjacent links, and means on the thresher for setting said shaft.

In testimony whereof I affix my signature.

THOMAS DUGAN. [L. S.]